March 12, 1940.   R. T. BAUGH   2,193,387
COAL CUTTER
Filed Sept. 15, 1938   2 Sheets-Sheet 1
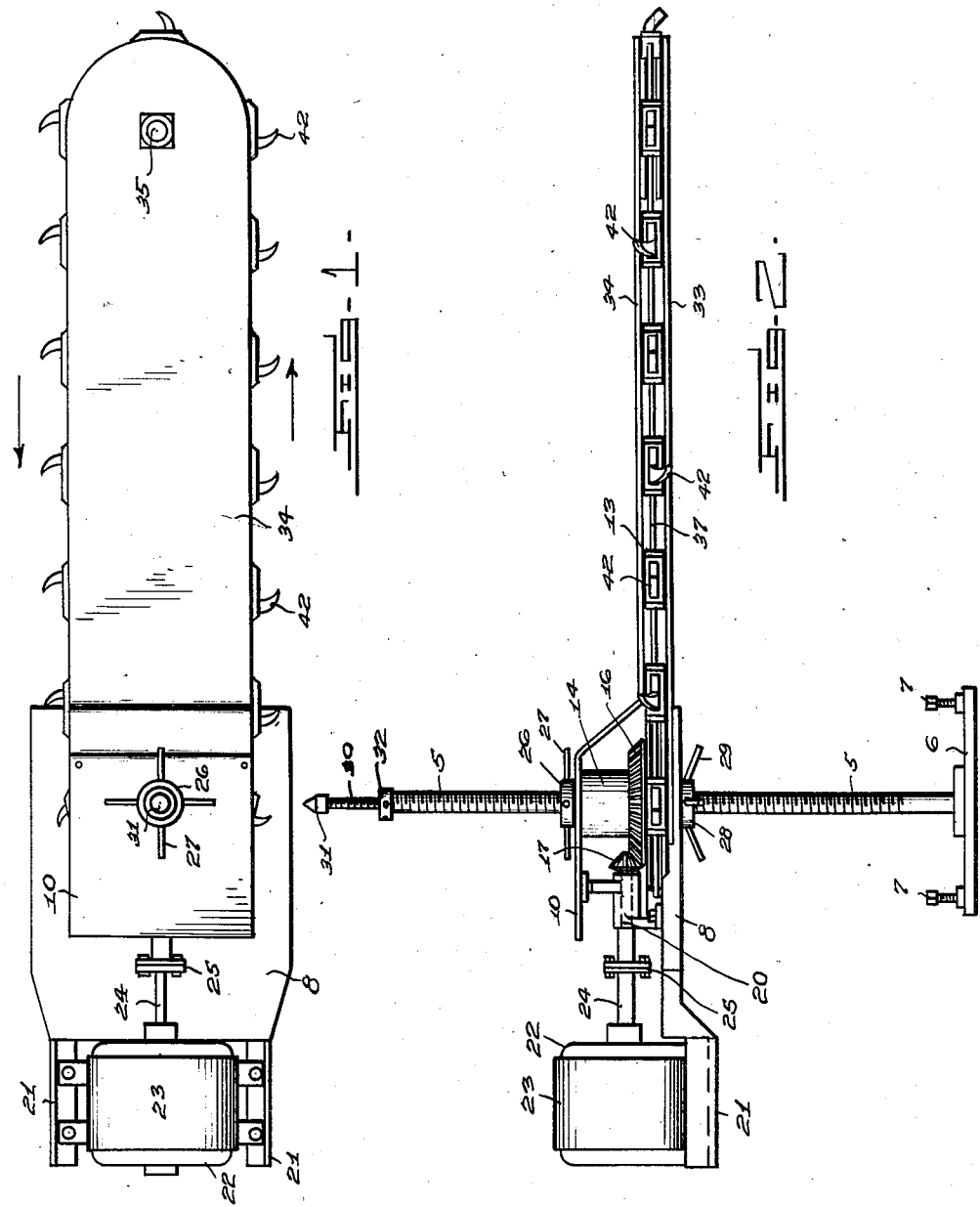
Inventor
ROBERT T. BAUGH,
By *Clarence A. O'Brien*
and *Hyman Berman*
Attorneys March 12, 1940.  R. T. BAUGH  2,193,387
COAL CUTTER
Filed Sept. 15, 1938  2 Sheets-Sheet 2
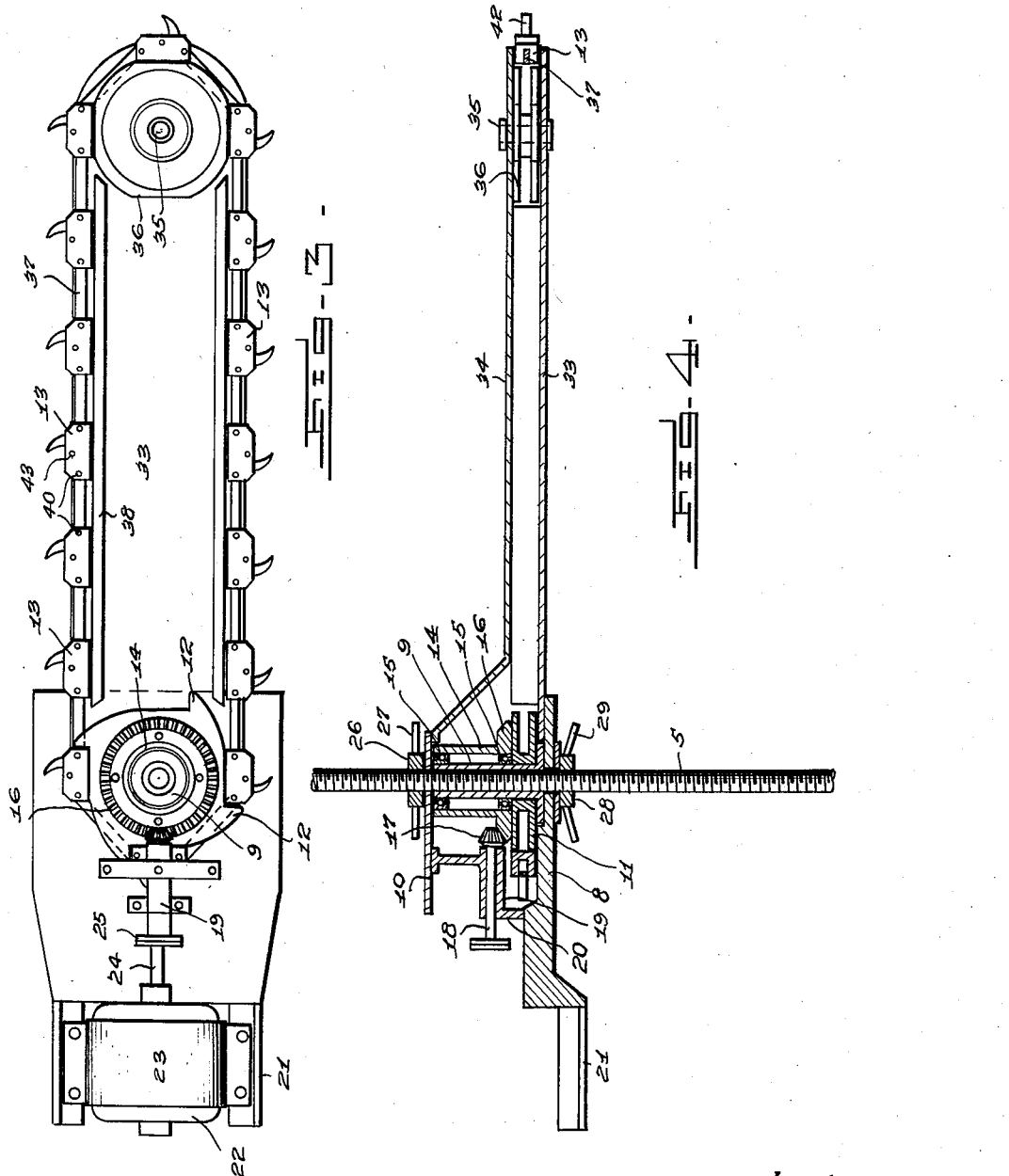
Inventor
ROBERT T. BAUGH,
By Clarence A. O'Brien
and Hyman Berman
Attorneys Patented Mar. 12, 1940

2,193,387

UNITED STATES PATENT OFFICE 2,193,387

COAL CUTTER

Robert T. Baugh, Huntsville, Ala., assignor to Robert T. Baugh, Jr., Huntsville, Ala.

Application September 15, 1938, Serial No. 230,116

1 Claim. (Cl. 262—28)

This invention appertains to new and useful improvements in coal cutters or coal picks and more particularly to a machine for cutting partings out of coal seams, as well as to cut solid coal.

The principal object of the present invention is to provide a cutting mechanism of the character stated which will materially reduce the amount of slack coal and small undesirable sizes thereof.

Another important object of the invention is to provide a machine which can be operated economically and which in operation will materially reduce the creation of waste coal.

Another important object of the invention is to provide an electric coal pick which can be driven by a motor of low horsepower.

These and various other important objects and advantages of the invention will become apparent to the reader of the following specification.

In the drawings:

Figure 1 represents a top plan view.

Figure 2 is a side elevational view.

Figure 3 is a top plan view with the top plate and supporting post removed.

Figure 4 is a fragmentary vertical sectional view.

Referring to the drawings wherein like numerals designate like parts, it can be seen that numeral 5 represents the post which rises from the floor base 6 and numeral 7 represents anchoring screws for the base.

The post extends upwardly through the table 8 and through the tube 9, the screws extending upwardly through the cover plate 10. Numeral 11 represents the circumferentially channeled cam which has the lateral extension 12 for catching behind the cutter block 13 and feeding the cutter chains.

Interposed between the tube 9 and the barrel 14 which circumscribes the tube 9 are the ball bearing mounts 15, the lower end of this barrel 14 being provided with the ring gear 16 with which meshes the bevel pinion 17 on the inner end of the shaft 18, which shaft is journaled through the bearing 19 supported by the bracket 20.

Arms 21 extend from the plate form or table 8 and these arms support the electric motor 22 which is further held in place on the arm 21 by the clamp band 23. Numeral 24 represents the armature shaft extending from the motor 22 and this is connected by the coupling 25 to the aforementioned shaft 18.

A nut 26 is provided on the threaded post 5 above the mechanism above described and has arms 27 extending therefrom to facilitate rotation of the same, while supporting the mechanism aforedescribed is the nut 28 having the arms 29 extending therefrom to facilitate rotation of the nut. With these two nuts clamped against the top and bottom sides of the mechanism, the cutter assembly can be firmly held in adjusted position.

The upper end of the post 5 is internally threaded to accommodate the extensible screw 30 which has the pointed head 31 capable of being driven into the roof of the mine. A jam nut 32 is provided on this extension 30, capable of being driven against the upper end of the post 5 to prevent self adjusting of the screw extension 30.

Numeral 33 represents the bottom plate of the producting cutter mechanism, while numeral 34 represents the top plate. Extending through the forward end portions of these plates 33 and 34 is the shaft 35 on which is the idling cam 36 circumferentially grooved to accommodate the block 13 and the connecting links 37 thereof. Numerals 38—38 represent guide rails mounted between the plates 33 and 34 to form a backing for the endless cutter while it is in operation.

As can be seen in Figure 4, the ring gear 16 is suitably secured as by welding to the cam 11 and the cam 11 in turn is rotatably mounted on the lower end of the tube 9. Obviously, as the motor 22 operates the gears 17 and 16 are operated and the cam 11 in turn drives the endless cutter. The endless cutter consists of a multiplicity of the blocks 13 each of which is cut out as at 39, that is, at each end to accommodate the adjacent ends of the links 37 and pin members 40 are driven through the end portions of the block 13 and through the adjacent ends of the links 37 to pivotally connect the links to the block.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A coal cutting machine of the character described comprising a vertical threaded post, a table vertically adjustable on the post, an electric motor carried by the table, an endless cutter assembly, means between the motor and the assembly whereby the assembly is driven, independent clamp means above and below the table constructed and arranged whereby the apparatus can be held in an adjusted position on the post, said clamp means each consisting of a nut threadedly disposed on the post and hand engageable arms radiating from said nuts.

ROBERT T. BAUGH.